US007558897B2

(12) United States Patent
Davies et al.

(10) Patent No.: US 7,558,897 B2
(45) Date of Patent: Jul. 7, 2009

(54) METHOD FOR ADOPTING AN ORPHAN I/O PORT IN A REDUNDANT STORAGE CONTROLLER

(75) Inventors: Ian Robert Davies, Longmont, CO (US); Victor Key Pecone, Lyons, CO (US)

(73) Assignee: Dot Hill Systems Corporation, Carlsbad, CA (US)

(*) Notice: Subject to any disclaimer, the term of this patent is extended or adjusted under 35 U.S.C. 154(b) by 0 days.

(21) Appl. No.: 11/466,382

(22) Filed: Aug. 22, 2006

(65) Prior Publication Data

US 2006/0282701 A1    Dec. 14, 2006

Related U.S. Application Data

(60) Division of application No. 10/946,341, filed on Sep. 21, 2004, now Pat. No. 7,146,448, which is a continuation-in-part of application No. 10/368,688, filed on Feb. 18, 2003, now Pat. No. 7,143,227, and a continuation-in-part of application No. 09/967,126, filed on Sep. 28, 2001, now Pat. No. 7,062,591, and a continuation-in-part of application No. 09/967,194, filed on Sep. 28, 2001, now Pat. No. 7,437,493, and a continuation-in-part of application No. 09/967,027, filed on Sep. 28, 2001, now Pat. No. 6,839,788.

(60) Provisional application No. 60/554,052, filed on Mar. 17, 2004.

(51) Int. Cl.
*G06F 13/24* (2006.01)

(52) U.S. Cl. .................. 710/260; 710/261; 711/114; 714/769

(58) Field of Classification Search ......... 710/301–306, 710/260–269; 711/6, 114; 709/217; 714/769
See application file for complete search history.

(56) References Cited

U.S. PATENT DOCUMENTS 4,217,486 A    8/1980    Tawfik et al.

(Continued)

FOREIGN PATENT DOCUMENTS

| EP | 0800138 A | 10/1997 |
| EP | 0817054 | 1/1998 |
| EP | 0967552 | 12/1999 |
| GB | 2396726 A | 6/2004 |
| JP | 2001142648 | 5/2001 |
| WO | WO2001082077 | 11/2001 |
| WO | WO2006124217 | 11/2006 |
| WO | WO2007002219 | 1/2007 |

OTHER PUBLICATIONS

Young et al. *A high I/O reconfigurable crossbar switch*. 11th Annual IEEE Symposium on Field-Programmable Custom Computing Machines, 2003. FCCM 2003. Apr. 9-11, 2003. pp. 3-10.

(Continued)

*Primary Examiner*—Clifford H Knoll
*Assistant Examiner*—Kim T Huynh
(74) *Attorney, Agent, or Firm*—E. Alan Davis; James W. Huffman

(57) ABSTRACT

A method for adopting an orphaned I/O port of a storage controller is disclosed. The storage controller has first and second redundant field-replaceable units (FRU) for processing I/O requests and a third FRU having at least one I/O port for receiving the I/O requests from host computers coupled to it. Initially the first FRU processes the I/O requests received by the I/O port and the third FRU routes to the first FRU interrupt requests generated by the I/O port in response to receiving the I/O requests. Subsequently, the second FRU determines that the first FRU has failed and is no longer processing I/O requests received by the I/O port, and configures the third FRU to route the interrupt requests from the I/O port to the second FRU rather than the first FRU, in response to the determining that the first FRU has failed.

9 Claims, 7 Drawing Sheets

U.S. PATENT DOCUMENTS

| | | |
|---|---|---|
| 4,251,869 A | 2/1981 | Shaffer |
| 4,428,044 A | 1/1984 | Liron |
| 5,345,565 A | 9/1994 | Jibbe et al. |
| 5,408,644 A | 4/1995 | Schneider et al. |
| 5,483,528 A | 1/1996 | Christensen |
| 5,530,842 A | 6/1996 | Abraham et al. |
| 5,553,023 A | 9/1996 | Lau et al. |
| 5,613,068 A | 3/1997 | Gregg et al. |
| 5,619,642 A | 4/1997 | Nielson et al. |
| 5,619,644 A | 4/1997 | Crockett et al. |
| 5,668,956 A | 9/1997 | Okazawa et al. |
| 5,680,579 A | 10/1997 | Young et al. |
| 5,706,283 A | 1/1998 | Suzuki |
| 5,754,884 A | 5/1998 | Swanstrom |
| 5,802,602 A | 9/1998 | Rahman et al. |
| 5,812,754 A | 9/1998 | Lui et al. |
| 5,881,254 A | 3/1999 | Corrigan et al. |
| 6,009,275 A | 12/1999 | DeKoning et al. |
| 6,038,680 A * | 3/2000 | Olarig ............................ 714/6 |
| 6,058,455 A | 5/2000 | Islam et al. |
| 6,094,699 A | 7/2000 | Surugucchi et al. |
| 6,098,140 A | 8/2000 | Pecone et al. |
| 6,185,652 B1 | 2/2001 | Shek et al. |
| 6,223,252 B1 | 4/2001 | Bandera et al. |
| 6,243,829 B1 | 6/2001 | Chan |
| 6,272,533 B1 | 8/2001 | Browne |
| 6,397,293 B2 | 5/2002 | Shrader et al. |
| 6,421,769 B1 | 7/2002 | Teitenberg et al. |
| 6,438,603 B1 | 8/2002 | Ogus |
| 6,470,429 B1 | 10/2002 | Jones et al. |
| 6,493,795 B1 | 12/2002 | Arsenault et al. |
| 6,502,157 B1 | 12/2002 | Batchelor et al. |
| 6,507,581 B1 | 1/2003 | Sgammato |
| 6,629,179 B1 | 9/2003 | Bashford |
| 6,718,408 B2 | 4/2004 | Esterberg et al. |
| 6,732,243 B2 | 5/2004 | Busser et al. |
| 6,839,788 B2 | 1/2005 | Pecone |
| 6,912,621 B2 | 6/2005 | Harris |
| 6,944,617 B2 | 9/2005 | Harriman |
| 7,046,668 B2 | 5/2006 | Pettey et al. |
| 7,069,368 B2 | 6/2006 | Thornton |
| 7,071,946 B2 | 7/2006 | Jeddeloh |
| 7,107,343 B2 | 9/2006 | Rinaldis et al. |
| 7,149,819 B2 | 12/2006 | Pettey |
| 7,457,902 B2 | 11/2008 | Yang et al. |
| 2001/0013076 A1 | 8/2001 | Yamamoto |
| 2002/0029319 A1 | 3/2002 | Robbins et al. |
| 2002/0069317 A1 | 6/2002 | Chow et al. |
| 2002/0069334 A1 | 6/2002 | Hsia et al. |
| 2002/0083111 A1 | 6/2002 | Row et al. |
| 2002/0091828 A1 | 7/2002 | Kitamura et al. |
| 2002/0099881 A1 | 7/2002 | Gugel |
| 2002/0194412 A1 | 12/2002 | Bottom |
| 2003/0065733 A1 | 4/2003 | Pecone |
| 2003/0065836 A1 | 4/2003 | Pecone |
| 2003/0217211 A1 | 11/2003 | Rust et al. |
| 2004/0064638 A1* | 4/2004 | Chong, Jr. .................. 711/114 |
| 2004/0177126 A1 | 9/2004 | Maine |
| 2004/0221198 A1* | 11/2004 | Vecoven ...................... 714/25 |
| 2005/0044169 A1* | 2/2005 | Arbeitman et al. .......... 709/217 |
| 2005/0102549 A1 | 5/2005 | Davies et al. |
| 2005/0102557 A1 | 5/2005 | Davies et al. |
| 2006/0106982 A1 | 5/2006 | Ashmore et al. |
| 2006/0161707 A1 | 7/2006 | Davies et al. |
| 2006/0161709 A1 | 7/2006 | Davies |
| 2006/0230218 A1 | 10/2006 | Warren et al. |
| 2006/0242312 A1 | 10/2006 | Crespi et al. |
| 2006/0248308 A1 | 11/2006 | Wang et al. |
| 2006/0248400 A1 | 11/2006 | Miyamoto |
| 2008/0005410 A1 | 1/2008 | Mies et al. |
| 2008/0005470 A1 | 1/2008 | Davies |
| 2008/0201616 A1 | 8/2008 | Ashmore |

OTHER PUBLICATIONS

Landman et al. *Activity-sensitive architectural power analysis*. IEEE Transactions on Computer-Aided Design of Integrated Circuits and Systems. Jun. 1996. pp. 571-587.

U.S. Office Action for U.S. Appl. No. 09/967,027, Apr. 30, 2004, pp. 1-7 and cover sheet.

U.S. Office Action for U.S. Appl. No. 09/967,126, Mar. 7, 2005, pp. 1-5 and cover sheet.

European Examination Report for Application No. GB0406742.7, dated Nov. 10, 2004.

European Examination Report for Application No. GB0406739.3, dated Nov. 10, 2004.

European Examination Report for Application No. GB0406740.1, dated Nov. 10, 2004.

"PCI-X Synthesizable Core." inSilicon Corporation. San Jose, CA. 1999.

"IBM 133 PCI-X Bridge" Datasheet. Apr. 6, 2001.

"IBM 133 PCI-X Bridge" Datasheet 2000. IBM Microelectronics Division.

"Tsi320™ Software Initialization Application Note." Oct. 2001. 80A600B_AN002_01. Tundra Semiconductor Corporation.

"PCI-X Bus Test Environment." 1999. inSilicon Corporation 411 East Plumeria Dr. San Jose, CA 95134.

"Compaq Rapid Enabler for PCI-X (CREX) Initiator Interface." (Preliminary). Revision 0.28 Sep. 2, 1999.

"Intel 41210 Serial to Parallel PCI Bridge Datasheet." Intel Corporation. Sep. 2003.

"Intel 41210 Serial to Parallel PCI Bridge Design Guide." Intel Corporation. Nov. 2003.

"QL5064—QuickPCI™" DataSheet, Rev B. Feb. 2, 2000. QuickLogic.

"IDT 89HPES12N3 PCI Express Switch." User Manual Table of Contents & Overview. Integrated Device Technology, Feb. 8, 2006.

"IDT 89HPES24N3 PCI Express Switch." User Manual Table of Contents & Overview, Integrated Device Technology, Feb. 8, 2006.

"Compaq Rapid Enabler for PCI-X (CREX) Target Bus Interface." (Preliminary). Revision 0.36 Sep. 2, 1999.

"Intel 41210 Serial to Parallel PCI Bridge Product Brief." Intel Corporation. 2003.

Pericom. "Bridge Products Road Map." Customer Presentation. pp. 31, 33-35.

IDT. "24-lane 3-Port PCI Express Switch" Product Brief. 89PES24N3. Dec. 22, 2005. Integrated Device Technology, Inc.

"PEX 8104" Data Book. Version 0.61. Mar. 2004. PLX Technology, Inc.

"PEX 8114 PCI Express to PCI/PCI-X Bridge." Product Brief. Version 2.0. 2004. PLX Technology, Inc.

"Tsi320™ PCI/X-to-PCI/X Bus Bridge Manual." Jan. 2001. 80A600B_MA001_02. Tundra Semiconductor Corporation.

"Tsi320™ Dual-Mode PCI-to-PCI Bus Bridge Errata." Sep. 2001. 80A600B_ER001_05. Tundra Semiconductor Corporation.

"Tsi320™ Dual-Mode PCI-to-PCI Bus Bridge User Manual." Jun. 2001. 80A600B_MA001_04. Tundra Semiconductor Corporation.

"X-caliber Design Specification: PCI-2.2/PCI-X Megacell" Rev 0.99.3. Nov. 19, 1999.

DCM Presentation. DCM Technologies, 39675 Cedar Blvd. #220, Newark, CA 94560.

"PEX 8114: PCI-X -PCI Express Bridge." Data Book. Version 0.70. May 2004. PLX Technology, Inc.

IDT. "24-lane 3-Port PCI Express Switch" Data Sheet. 89HPES24N3. Feb. 14, 2006. Integrated Device Technology, Inc.

IDT. "12-lane 3-Port PCI Express Switch" Data Sheet. 89HPES12N3. Feb. 14, 2006. Integrated Device Technology, Inc.

IDT. "12-lane 3-Port PCI Express Switch" Product Brief. 89PES12N3. Feb. 15, 2006. Integrated Device Technology, Inc.

Budruk et al. "PCI Express System Architecture." Addison Wesley Professional. Sep. 4, 2003.

LSI Corporation. MegaRaid SAS 8409E. Product Brief. 2007.

PCI-SIG, PCI Express Base Specification Revision 1.0A, Apr. 15, 2003.

Makijarvi, Petri, "PICMG1.3 SHB Raid Performance: Evaluating Next Generation High-Performance PC 4U Computers." Jul. 4, 2007.

Luse, Paul. "The Benefits of RAID on Motherboard." May 2003.

Overland Storage. "Tiered Data Protection Made Simple." 2008.

\* cited by examiner

Storage Controller with Ability to Adopt Orphan I/O Ports

Failback Operation After Orphan I/O Port Adoption

METHOD FOR ADOPTING AN ORPHAN I/O PORT IN A REDUNDANT STORAGE CONTROLLER

CROSS REFERENCE TO RELATED APPLICATION(S)

This application is a divisional of co-pending U.S. patent application Ser. No. 10/946,341 filed on Sep. 21, 2004.

U.S. patent application Ser. No. 10/946,341 is a continuation-in-part (CIP) of the following co-pending Non-Provisional U.S. Patent Applications, which are hereby incorporated by reference in their entirety for all purposes:

| Ser. No. | Filing Date | Title |
| --- | --- | --- |
| 09/967,027 | Sep. 28, 2001 | BUS ZONING IN A CHANNEL INDEPENDENT CONTROLLER ARCHITECTURE |
| 09/967,126 | Sep. 28, 2001 | CONTROLLER DATA SHARING USING A MODULAR DMA ARCHITECTURE |
| 09/967,194 | Sep. 28, 2001 | MODULAR ARCHITECTURE FOR NETWORK STORAGE CONTROLLER |
| 10/368,688 | Feb. 18, 2003 | BROADCAST BRIDGE APPARATUS FOR TRANSFERRING DATA TO REDUNDANT MEMORY SUBSYSTEMS IN A STORAGE CONTROLLER |

U.S. patent application Ser. No. 10/946,341 claims the benefit of the following U.S. Provisional Applications, each of which is incorporated by reference in its entirety for all purposes:

| Ser. No. | Filing Date | Title |
| --- | --- | --- |
| 60/554052 | Mar. 17, 2004 | LIBERTY APPLICATION BLADE |

BACKGROUND OF THE INVENTION

Field of the Invention

The present invention relates in general to the field of fault-tolerant storage controllers, and particularly to failover of failed I/O ports thereof.

Today's computer networks include vast amounts of storage, require high data throughput, and demand high data availability. Many networks support hundreds or even thousands of users connected to them. Many networks store extremely valuable data, such as bank account information, personal medical information, databases whose unavailability equates to huge sums of lost revenue due to inability to sell a product or provide a service, and scientific data gathered over large amounts of time and at great expense.

A typical computer network includes one or more computers connected to one or more storage devices, such as disk drives or tape drives, by one or more storage controllers. One technique for providing higher data availability in computer networks is to include redundant components in the network. Providing redundant components means providing two or more of the component such that if one of the components fails, one of the other redundant components continues to perform the function of the failed component. In many cases, the failed component can be quickly replaced to restore the system to its original data availability level. For example, some network storage controllers include redundant hot-pluggable field replaceable units (FRUs), commonly referred to as blades. If one of the blades fails it may be replaced with a good blade while the system is still running to restore the storage controller to its original data availability level.

Another technique employed in storage controllers is modularity. A modular storage controller comprises multiple modules or FRUs such that one or more of the modules may be replaced without replacing all the modules of the storage controller. An advantage of modularity may be increased performance in a cost effective manner. For example, the RIO RAID controller sold by Dot Hill Systems Corp. of Carlsbad, Calif., formerly Chaparral Network Storage, Inc., is a redundant modular storage controller.

FIG. 1 illustrates a RIO RAID controller 100 in a common configuration. The RIO controller 100 includes a backplane 108 including four local buses 112, denoted 112A, 112B, 112C, and 112D. In one version of the product, the local buses 112 are PCI-X buses. The RIO RAID controller 100 also includes four modules, or blades, which are hot-pluggable into the backplane 108: two Data Manager (DM) blades 114, denoted DM-A 114A and DM-B 114B, and two Data Gate (DG) blades 116, denoted DG-A 116A and DG-B 116B. Each of the blades 114 and 116 is a field-replaceable unit (FRU). Each DG blade 116 includes two I/O controllers 126, denoted 126A and 126B. Each I/O controller 126 includes two I/O ports 128, such as FibreChannel (FC) ports, for connecting to host computers and disk drives. Each of the four I/O controllers 126 also has a local bus interface for interfacing with a different one of the local buses 112. On one version of the RIO RAID controller 100, the I/O controllers 126 are JNIC-1560 Milano dual channel FibreChannel to PCI-X controllers. Each DM blade 114 includes a CPU 124, a memory 122, and a memory controller/bridge circuit 118 for interfacing the CPU 124 and memory 122 with two of the local buses 112. In the RIO RAID controller 100 of FIG. 1, DM-A 114A is connected to local bus 112A and 112B, and DM-B 114B is connected to local bus 112C and 112D. I/O controller 126A of DG-A 116A is connected to local bus 112A, I/O controller 126B of DG-A 116A is connected to local bus 112C, I/O controller 126A of DG-B 116B is connected to local bus 112B, and I/O controller 126B of DG-B 116B is connected to local bus 112D.

The I/O controllers 126 function as target devices of the CPUs 124. In particular, the I/O controllers 126A of DG-A 116A and DG-B 116B are controlled by DM-A 114A, and the I/O controllers 126B of DG-A 116A and DG-B 116B are controlled by DM-B 114B. Each of the I/O controllers 126 generates an interrupt request (IRQ) 134 that is routed through the backplane 108 to its respective controlling CPU 124. The I/O controllers 126 receive I/O requests from the host computers on their respective I/O ports 128 and in response generate an interrupt request 134 to notify the CPU 124 of the I/O request. Additionally, each of the I/O controllers 126 may generate an interrupt request 134 to notify its respective CPU 124 that it has received a packet of data from a disk drive or transmitted a packet of data to a disk drive or host computer. The memory 122 caches data from the disk drives for more efficient provision to the host computers. The CPU 124 performs RAID functions, such as performing logical block translation, striping, mirroring, controlling parity generation, processing I/O requests, data caching, buffer management, and the like.

An advantage of a modular approach such as that of the RIO RAID controller 100, is that it provides an architecture for cost effective upgrades to the storage controller 300. For example, in some versions of the RIO RAID controller products, the customer may incrementally add or delete DG blades 116 from the configuration based on connectivity and data availability requirements, such as based on the number of host computers and disk drives to be connected. Additionally, the architecture potentially provides the customer the ability to migrate in technology. For example, a subsequent DG blade could be provided that uses a different interface technology other than FibreChannel, such as SCSI, Infiniband, SATA, iSCSI, etc. Advantageously, the DM blades 114 would not have to be replaced (although a firmware upgrade of the DM blades 14 might be required) in order to enjoy the benefit of the migration in I/O interface technology. Also, the architecture facilitates higher density in 1 U high 19" rack-mountable enclosures.

FIG. 2 illustrates a scenario in which DM-A 114A has failed. DM-B 114B detects that DM-A 114A has failed via loss of a heartbeat signal 134A from DM-A 114A. When DM-B 114B detects that DM-A 114A has failed, DM-B 114B performs an active-active failover operation to take over processing I/O requests from the host computers previously serviced by DM-A 114A. This is possible because in a typical configuration DM-B 114B is able to communicate with all of the disk drives—including the disk drives comprising the logical units, or disk arrays—previously controlled by now failed DM-A 114A and because in a typical configuration the host computers are capable of issuing requests to the RIO RAID controller 100 via an alternate path, namely through one of the I/O ports 128 connected to surviving DM-B 114B, as discussed below.

Unfortunately, as may be observed from FIG. 2, the I/O ports 128 previously owned by failed DM-A 114A, namely the I/O ports 128 of the I/O controllers 126A of each of DG-A 116A and DG-B 116B, are now inaccessible by DM-B 114B since DM-B 114B has no local bus 112 path to the I/O controllers 126A. Consequently, the I/O ports 128 of the I/O controllers 126A not connected to the surviving DM-B 114B are unused, and are referred to as "orphaned" I/O ports.

There are disadvantages of incurring orphaned I/O ports. In a typical configuration, prior to the failure, DM-A 114A is responsible for servicing I/O requests from some of the host computers to transfer data with some of the disk drives, and DM-B 114B is responsible for servicing I/O requests from the rest of the host computers to transfer data with the rest of the disk drives. In the worst case scenario, the host computers and/or disk drives previously serviced by DM-A 114A are not also connected to the non-orphaned I/O ports 128 (I/O ports 128 of the I/O controllers 126B connected to DM-B 114B), or the host computers previously serviced by DM-A 114A are not configured to use multi-pathing (discussed below), resulting in a loss of data availability.

In the best case scenario, the host computers and disk drives previously serviced by DM-A 114A are connected to the non-orphaned I/O ports 128, thereby enabling DM-B 114B to function in a redundant manner with DM-A 114A to tolerate the failure of DM-A 114A. In this scenario, in response to detecting the failure of DM-A 114A, DM-B 14B resets DM-A 114A via a reset line 132B, and services I/O requests from the host computers previously serviced by DM-A 114A via the non-orphaned I/O ports 128. DM-B 114B may service I/O requests from the host computers previously serviced by DM-A 114A by causing the non-orphaned I/O ports 128 to impersonate the orphaned I/O ports 128. DM-B 114B may cause the non-orphaned I/O ports 128 to impersonate the orphaned I/O ports 128 in two ways: DM-B 114B may cause the non-orphaned I/O ports 128 to change their personality to the orphaned I/O ports' 128 personality, or DM-B 114B may cause the non-orphaned I/O ports 128 to add to their current personality the orphaned I/O ports' 128 personality.

Each of the I/O ports 128 has a unique ID for communicating with the host computers and disk drives, such as a unique world-wide name on a FibreChannel point-to-point link, arbitrated loop, or switched fabric network. The first impersonation technique—causing the non-orphaned I/O ports 128 to change their personality to the orphaned I/O ports 128 personality—operates as follows. When DM-B 114B detects that DM-A 114A has failed, DM-B 114B reprograms one or more of the non-orphaned I/O ports 128 to communicate using the unique IDs previously used by the orphaned I/O ports. Consequently, the reprogrammed non-orphaned I/O ports 128 appear as the orphaned I/O ports, thereby continuing to provide data availability to the host computers and/or disk drives.

The second impersonation technique—causing the non-orphaned I/O ports 128 to add to their current personality the orphaned I/O ports 128 personality—is referred to as "multi-ID" operation. When DM-B 114B detects that DM-A 114A has failed, DM-B 114B reprograms the non-orphaned I/O ports 128 to communicate using not only their previous unique IDs, but also using the unique ID of the orphaned I/O ports. Consequently, the non-orphaned I/O ports 128 appear as the orphaned I/O ports, thereby continuing to provide data availability.

However, there are problems associated with each of these techniques. First, neither of the techniques is transparent to the host computers. That is, each technique may require the host computers to have the capability to begin transmitting I/O requests along a different path to the non-orphaned I/O ports 128, a technique referred to as "multi-pathing." Furthermore, multi-ID operation is not supported in the FibreChannel point-to-point configuration, and for some users it is desirable to connect the host computers in a FibreChannel point-to-point configuration, rather than in an arbitrated loop or switched fabric configuration. Additionally, some Fibre-Channel switches do not support arbitrated loop mode, but only support point-to-point mode, with which multi-ID operation may not be used.

A still further problem with orphaned I/O ports is that data throughput is lost even assuming the surviving DM blade 114 is able to failover via non-orphaned I/O ports 128. During normal operation, the DM blades 114 and DG blades 116 operate in an active-active manner such that data may be transferred simultaneously between all the I/O ports 128 along all the local buses 112 and the memory 122, resulting in very high data throughput. However, a reduction in throughput may be a consequence of some of the I/O ports 128 being orphaned.

Therefore, what is needed is an apparatus and method for the surviving DM blade 114 to adopt the orphaned I/O ports 128.

SUMMARY OF INVENTION

The present invention provides an enhanced data gate blade that includes a bus bridge that enables a surviving data manager blade to adopt the orphaned I/O ports by enabling a local bus connection between the surviving data manager blade and the I/O controller having the orphaned I/O ports.

In one aspect, the present invention provides a method for adopting an orphaned I/O port of a storage controller. The storage controller has first and second redundant field-replaceable units (FRU) for processing I/O requests and a third FRU having at least one I/O port for receiving the I/O requests from host computers coupled thereto. Initially the first FRU is configured to process the I/O requests received by the I/O port. The third FRU is initially configured to route to the first FRU interrupt requests generated by the I/O port in response to receiving the I/O requests. The method includes determining, by the second FRU, that the first FRU has failed and is no longer processing I/O requests received by the I/O port. The method also includes configuring the third FRU to route the interrupt requests from the I/O port to the second FRU rather than the first FRU in response to determining that the first FRU has failed.

An advantage of the present invention is that it provides transparent failover to the host computers. Another advantage is that it eliminates the need to have the non-orphaned I/O ports impersonate the orphaned I/O ports, thereby eliminating the requirement for the host computers to have the capability to multi-path. In particular, the present invention eliminates the need to use multi-ID operation to perform failover to the surviving data manager blade. Another advantage is that there is potentially essentially no throughput loss once the orphaned I/O ports are adopted.

DETAILED DESCRIPTION OF THE INVENTION

Figure 1:
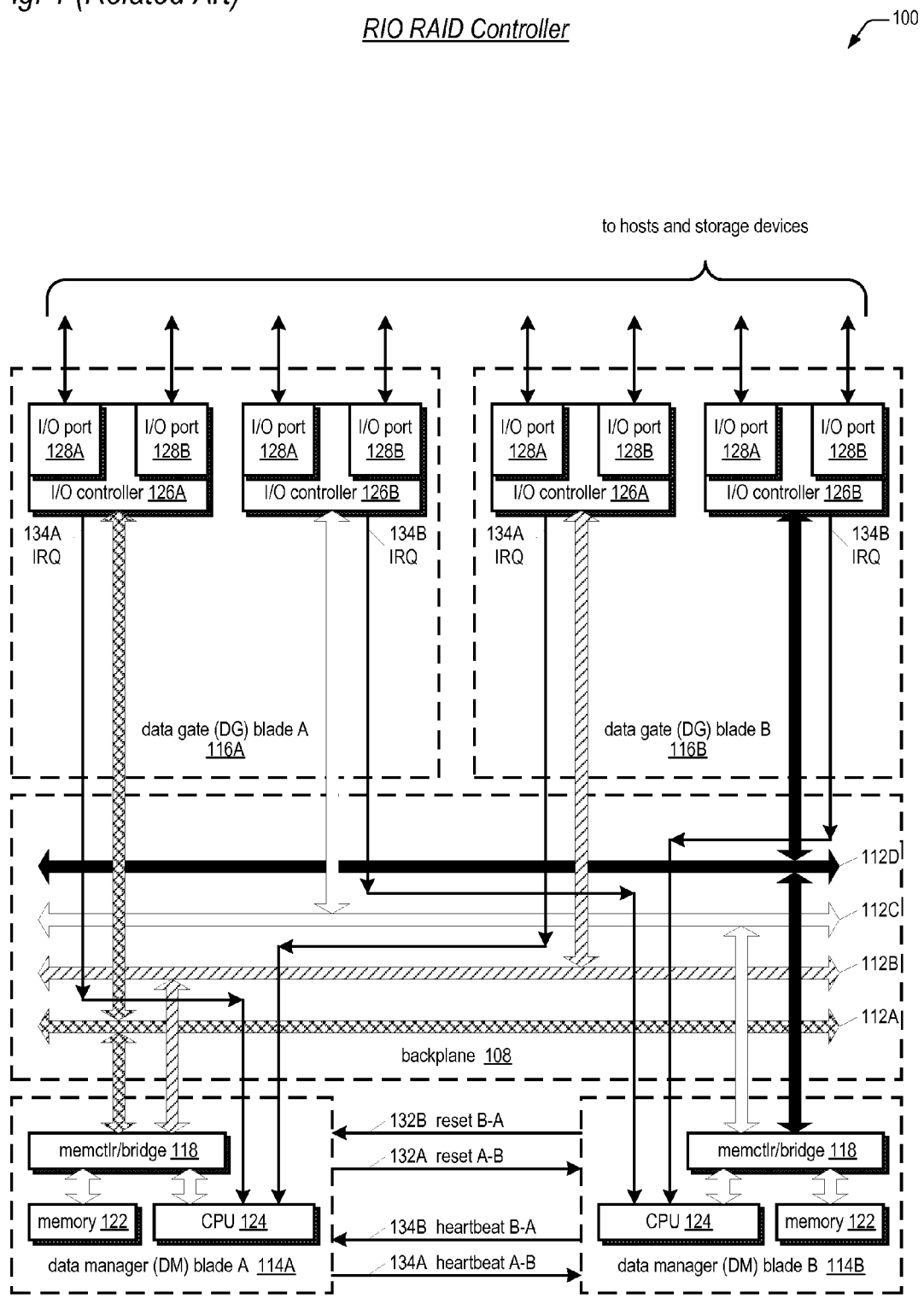
FIG. 1 is a related art block diagram of RIO RAID controller.
Figure 3:
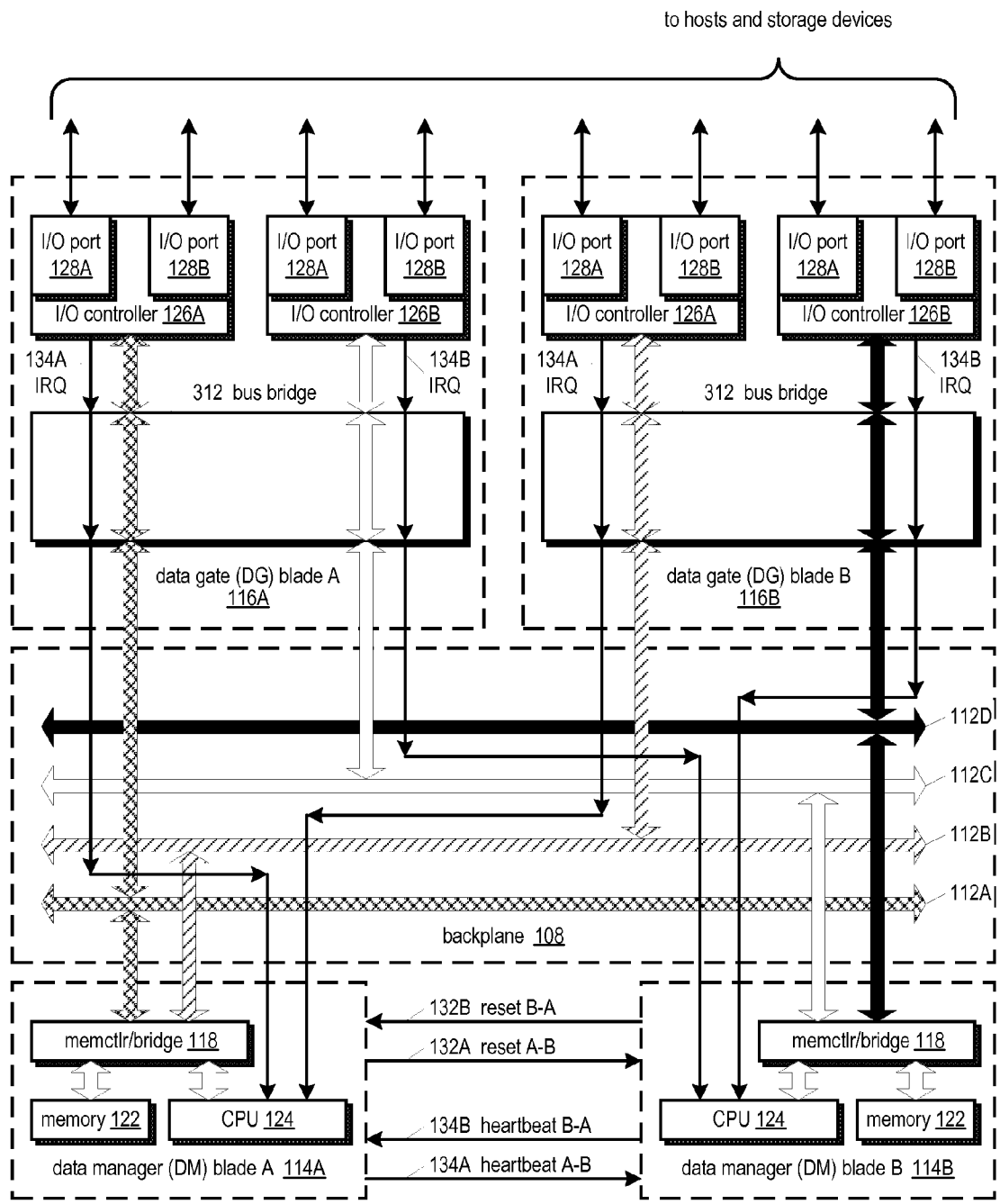
FIG. 3 is a block diagram of a storage controller with the ability to adopt orphaned I/O ports according to the present invention.

Referring now to FIG. 3, a block diagram of a storage controller 300 with the ability to adopt orphaned I/O ports according to the present invention is shown. The storage controller 300 of FIG. 3 is similar in some respects to the RIO RAID controller 100 of FIG. 1 and like-numbered elements may be similar. However, the DG blades 116 of the storage controller 300 further include a bus bridge 312 on each data gate blade 116. The bus bridge 312 is coupled between the I/O controllers 126 and the local buses 112. Furthermore, the CPU 124 of each DM blade 114 is programmed to perform orphaned I/O port adoption as described below. Each DM blade 114 is capable of resetting each of the DG blades 116. In one embodiment, each DM blade 114 has a dedicated line included in the backplane 108 to each of the DG blades 116 for resetting the respective DG blade 116. The bus bridge 312 is described in detail presently with respect to FIG. 5.

Figure 5:
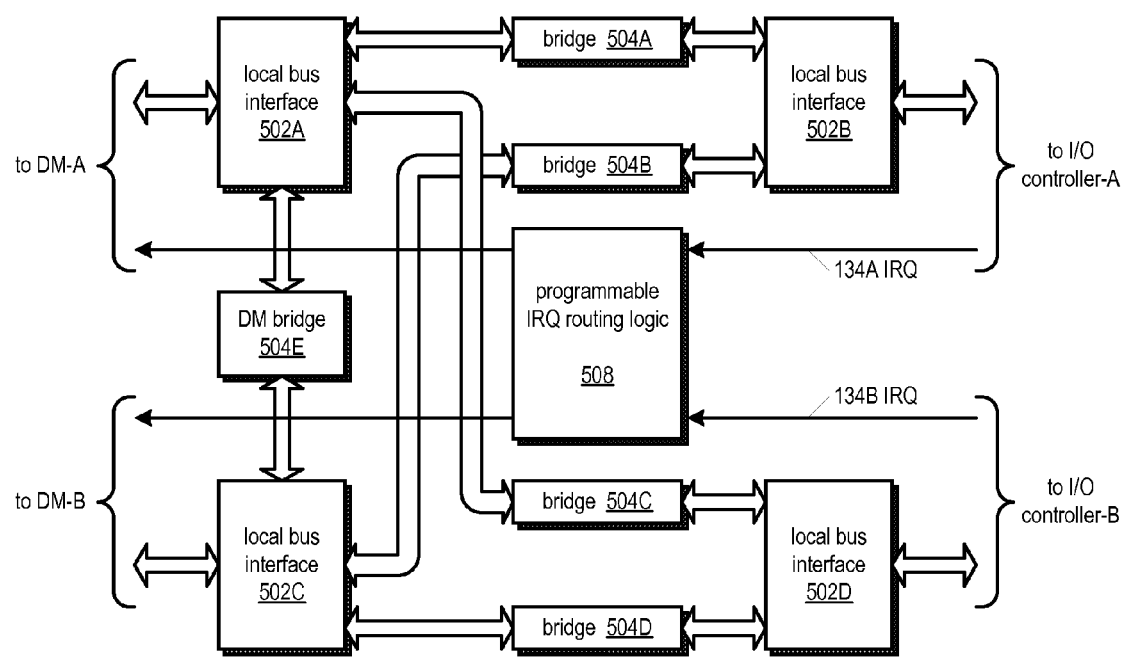
FIG. 5 is a block diagram illustrating the bus bridge of FIG. 3 according to the present invention.

Referring now to FIG. 5, a block diagram illustrating the bus bridge 312 of FIG. 3 according to the present invention is shown. The bus bridge 312 includes four local bus interfaces 502. The first local bus interface 502A is coupled to a local bus for coupling to one of the backplane 108 local buses 112 for coupling to DM-A 114A. A second local bus interface 502C is coupled to another local bus for coupling to another of the backplane 108 local buses 112 for coupling to DM-B 114B. A third local bus interface 502B is coupled to another local bus for coupling to I/O controller 126A. A fourth local bus interface 502D is coupled to another local bus for coupling to I/O controller 126B. In one embodiment, the local buses comprise PCI-X buses. Other embodiments are contemplated in which the local buses 516 include, but are not limited to a PCI, CompactPCI, PCI-Express, PCI-X2, EISA, VESA, VME, RapidIO, AGP, ISA, 3GIO, HyperTransport, Futurebus, MultiBus, or any similar local bus capable of transferring data at a high rate.

The bus bridge 312 also includes five bridge circuits 504. A first bridge circuit 504A bridges local bus interface 502A and local bus interface 502B, for enabling communication and data transfer between DM-A 114A and I/O controller 126A. A second bridge circuit 504B bridges local bus interface 502C and local bus interface 502B, for enabling communication and data transfer between DM-B 114B and I/O controller 126A. A third bridge circuit 504C bridges local bus interface 502A and local bus interface 502D, for enabling communication and data transfer between DM-A 114A and I/O controller 126B. A fourth bridge circuit 504D bridges local bus interface 502C and local bus interface 502D, for enabling communication and data transfer between DM-B 114B and I/O controller 126B. A fifth bridge circuit 504E bridges local bus interface 502A and local bus interface 502C, for enabling communication and data transfer between DM-A 114A and DM-B 114B. The bridge circuits 504 include local bus target and master circuits. The target circuits are configured to function as a target of local bus commands initiated by the respective local bus interfaces 502 and to cause the master circuits to regenerate the commands on the respective opposite local bus interface 502. In one embodiment, the bridge circuits 504 also include FIFO memories for buffering data transfers between the respective local bus interfaces 502.

The bus bridge 312 also includes programmable interrupt request routing logic 508. The interrupt request routing logic 508 receives the IRQ 134A from I/O controller 126A and the IRQ 134B from I/O controller 126B and selectively routes each of the IRQs 134 independently to either DM-A 114A or DM-B 114B as last programmed by the DM blades 114.

Figure 2:
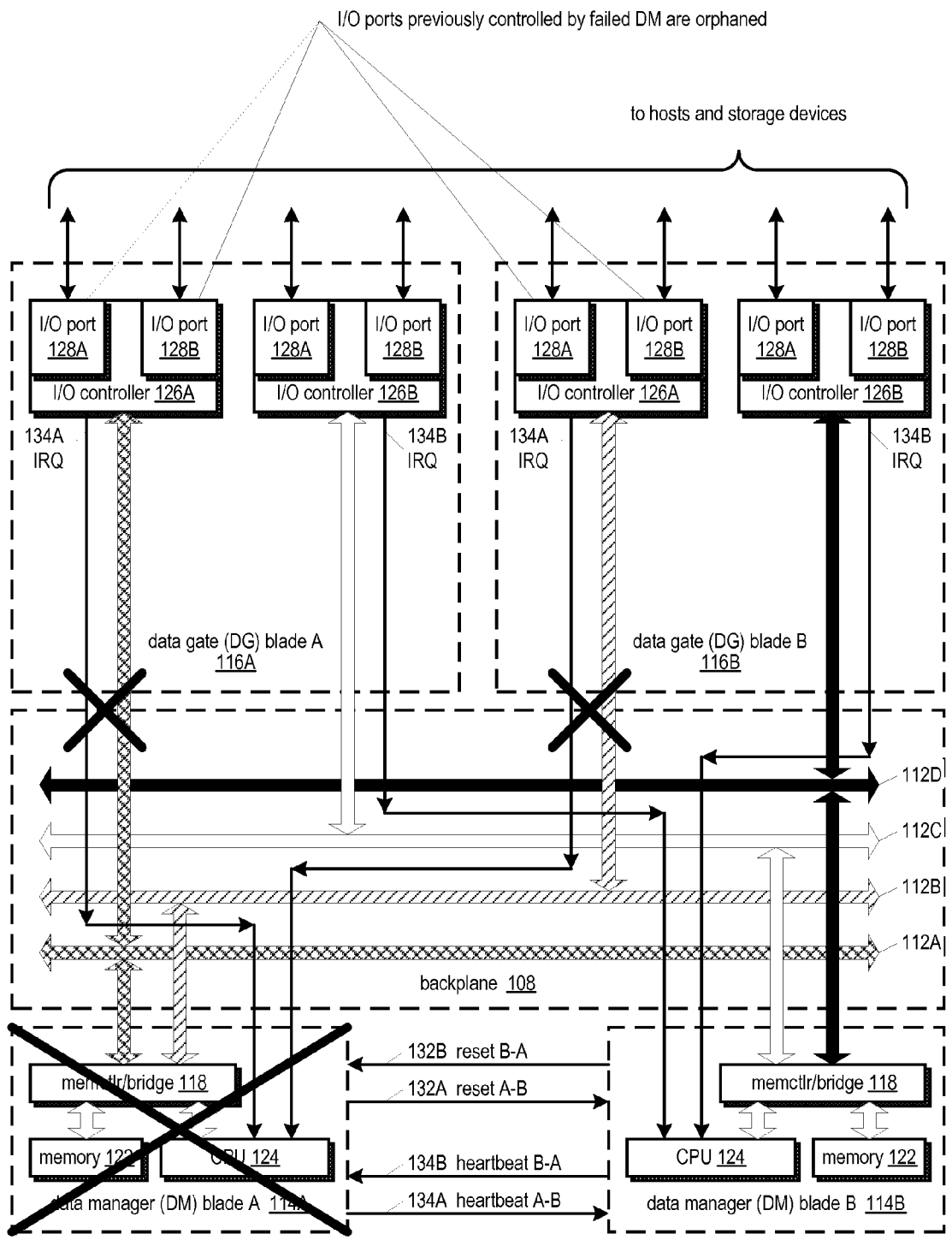
FIG. 2 is a related art block diagram of RIO RAID controller with a failed data manager blade causing some of the data gate blade I/O ports to be orphaned.
Figure 4:
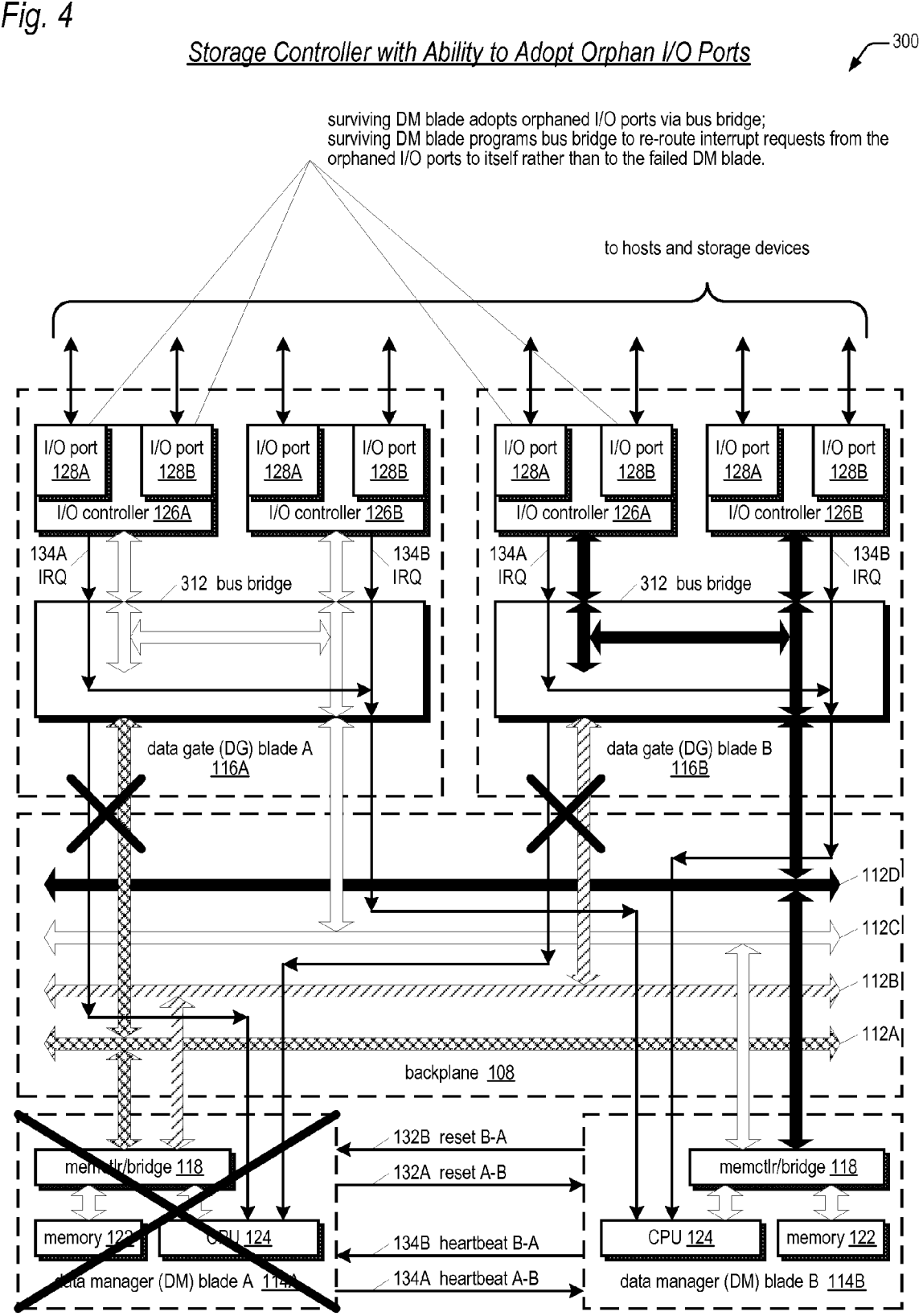
FIG. 4 is a block diagram of the storage controller of FIG. 3 illustrating the adoption of orphaned I/O ports according to the present invention.

Referring now to FIG. 4, a block diagram illustrating the storage controller 300 of FIG. 3 having a failed DM-A 114A is shown. As illustrated with respect to FIG. 2, without the benefit of the present invention, the I/O ports 128 of I/O controller 126B of each of the DG blades 116 would be orphaned I/O ports 128, i.e., the surviving DM-B 114B would not be able to access the I/O ports 128 of I/O controller 126A of each of the DG blades 116; i.e., the I/O ports 128 of I/O controller 126A of each of the DG blades 116 would be orphaned. However, advantageously, the bus bridge 312 of DG-A 116A also couples backplane 108 local bus 112C to I/O controller 126A, as shown, thereby providing a control and data path for surviving DM-B 114B to adopt the orphaned I/O ports 128 of DG-A 116A; similarly, the bus bridge 312 of DG-B 116B also couples backplane 108 local bus 112D to I/O controller 126A, as shown, thereby providing a control and data path for surviving DM-B 114B to adopt the orphaned I/O ports 128 of DG-B 116B. In one embodiment, each respective bus bridge 312 provides a constant path between each of the I/O controllers 126 and its respective local buses 112. In another embodiment, the surviving DM blade 114 must program the bus bridge 312 to provide the path to the I/O controller 126 having the orphaned I/O ports 128.

In addition, the bus bridge 312 of DG-A 116A re-routes the IRQ 134A from I/O controller 126A to the CPU 124 of DM-B 114B, as shown, in response to being programmed by the CPU 124; similarly, the bus bridge 312 of DG-B 116B re-routes the IRQ 134A from I/O controller 126A to the CPU 124 of DM-B 114B, as shown, in response to being programmed by the CPU 124, as described below with respect to FIG. 6. In one embodiment, the IRQ 134A of I/O controller 126A and the IRQ 134B of I/O controller 126B share an interrupt request input to CPU 124. In another embodiment, the IRQ 134A of I/O controller 126A and the IRQ 134B of I/O controller 126B occupy unique interrupt request inputs to CPU 124. In both embodiments, CPU 124 has the ability to individually clear the source of each of the IRQs 134A and 134B.

Figure 6:
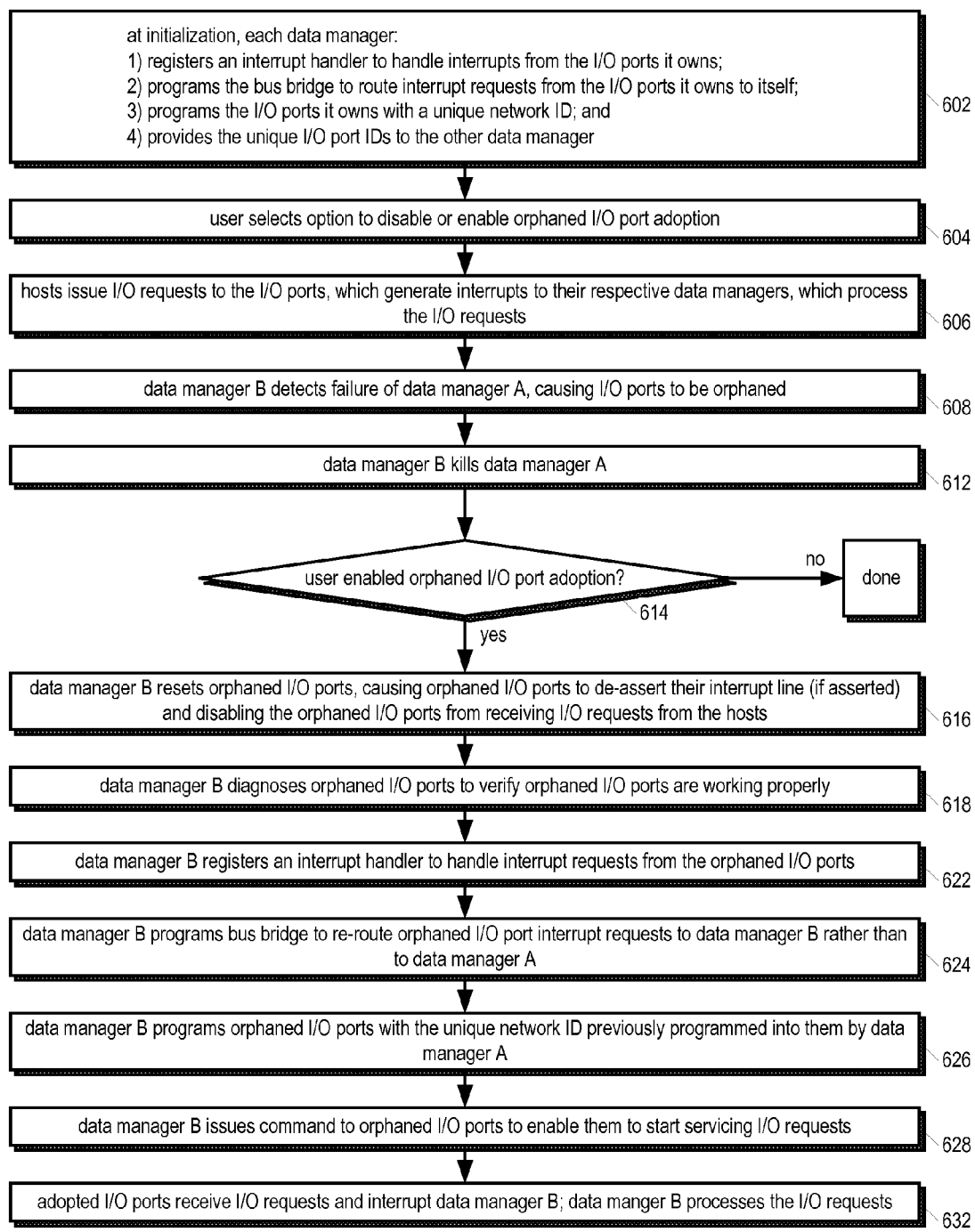
FIG. 6 is a flowchart illustrating operation of the storage controller of FIG. 3 to adopt orphaned I/O ports according to the present invention.

Referring now to FIG. 6, a flowchart illustrating operation of the storage controller 300 of FIG. 3 to adopt orphaned I/O ports 128 is shown. Flow begins at block 602.

At block 602, during initialization time, each DM blade 114 CPU 124 performs several initialization steps. In one embodiment, an operating system executes on the CPU 124, including a device driver controlling the I/O controllers 126. In one embodiment, each CPU 124 has its own dedicated memory for storing program instructions, such as the operating system programs. First, the device driver executing on the CPU 124 registers an interrupt handler routine with the operating system to handle interrupt requests 134 from the I/O controllers 126 it owns, i.e., from the I/O controllers 126 for which it will initially service I/O requests. In the embodiment of FIG. 3, the CPU 124 of DM-A 114A registers an interrupt handler to handle interrupts from the I/O controllers 126A of DG-A 116A and DG-B 116B, and the CPU 124 of DM-B 114B registers an interrupt handler to handle interrupts from the I/O controllers 126B of DG-A 116A and DG-B 116B. In one embodiment, the device driver also allocates needed memory, such as for storing data structures. Additionally, the CPU 124 programs the bus bridges 312 to route the IRQs 134 from the I/O controllers 126 it owns to itself. Furthermore, the CPU 124 programs the I/O ports 128 it owns with a unique ID. In one embodiment, the unique ID comprises a unique world-wide name. Other embodiments are contemplated in which the unique ID comprises a MAC address or IP address. In one embodiment, each DM blade 114 has a single unique ID associated with it that is programmed into the I/O ports 128 owned by the DM blade 114. In another embodiment, each DM blade 114 has multiple unique IDs associated with it that may be uniquely programmed into the various I/O ports 128 owned by the DM blade 114. Finally, the CPU 124 provides its unique ID or unique IDs to the other DM blade 114. In the case of multiple unique IDs, the CPU 124 also provides a mapping of which unique ID is programmed into which of the I/O ports 128 owned by the DM blade 114. In one embodiment, each I/O controller 126 includes a sequencer that executes program instructions, and at initialization the CPU 124 also loads the program instructions into the I/O controller 126 for execution by the sequencer. Flow proceeds to block 604.

At block 604, in one embodiment, the storage controller 300 receives input from a user to select an option whether to enable or disable orphaned I/O port adoption. Flow proceeds to block 606.

At block 606, normal I/O operation begins. That is, the host computers issue I/O requests to the I/O ports 128, which responsively generate IRQs 134 to their respective DM blades 114. In one embodiment, the I/O controllers 126 transfer the I/O request to the memory 122 prior to generating the interrupt request 134 to the CPU 124. In response to receiving the IRQ 134, the DM blade 114 CPUs 124 process the I/O requests. For example, if the I/O request is a disk write request, the DM blade 114 receives the write data from the host computer into its memory 122 and subsequently programs the appropriate I/O port 128 to write the data from its memory 122 to one or more disk drives, which may be part of a redundant array of disks. If the I/O request is a disk read request, the DM blade 114 determines whether the requested data is cached in the memory 122. If so, the DM blade 114 programs the appropriate I/O port 128 to write the data from its memory 122 to the host computer. Otherwise, the DM blade 114 reads the data from one or more disk drives into its memory 122 and subsequently writes the data from its memory 122 to the host computer. Flow proceeds to block 608.

At block 608, DM-B 114B detects the failure of DM-A 114A, causing I/O ports 128 to be orphaned, namely the I/O ports 128 of I/O controllers 126A of each of the DG blades 116. In one embodiment, DM-B 114B detects the failure of DM-A 114A via a loss of heartbeat 134A. Flow proceeds to block 612.

At block 612, DM-B 114B kills DM-A 114A. That is, DM-B 114B generates a reset 132B to reset DM-A 114A, and in particular to disable DM-A 114A from communicating with the I/O controllers 126A of each of the DG blades 116. Flow proceeds to decision block 614.

At decision block 614, the CPU 124 of DM-B 114B determines whether at block 604 the user enabled orphaned I/O port adoption. If so, flow proceeds to block 616; otherwise, flow ends.

At block 616, DM-B 114B resets the I/O controllers 126 having the orphaned I/O ports 128, causing the orphaned I/O controllers 126 to de-assert their interrupt requests 134, if they were asserted, and disabling the orphaned I/O ports 128 from receiving more I/O requests from the host computers. That is, the reset quiesces all I/O activity on the orphaned I/O ports 128. In one embodiment, the DM blades 114 reset the orphaned I/O controllers 126. Flow proceeds to block 618.

At block 618, DM-B 114B diagnoses the orphaned I/O ports 128 to verify that they are working properly. In one embodiment, DM-B 114B will not adopt the orphaned I/O ports 128 unless the orphaned I/O ports 128 are functioning properly since a hardware problem with an orphaned I/O port 128 may have caused DM-A 114A to fail. Advantageously, the present invention provides a means for the user to selectively disable or enable orphaned I/O port adoption, so that a more conservative user may avoid the risk of potentially adopting an orphaned I/O port that might also cause DM-B 114B to fail, even though the orphaned I/O port 128 was diagnosed as functioning properly. Flow proceeds to block 622.

At block 622, DM-B 114B registers an interrupt handler with the operating system to handle interrupt requests 134 from the orphaned I/O ports 128. Flow proceeds to block 624.

At block 624, DM-B 114B programs the bus bridge 312 to re-route interrupt requests 134 from the orphaned I/O controllers 126 to itself rather than to DM-A 114A. In one embodiment, DM-B 114B also programs the bus bridge 312 to make a path between itself and the orphaned I/O controllers 126. Flow proceeds to block 626.

At block 626, DM-B 114B programs the orphaned I/O ports 128 with the unique IDs previously programmed into them by DM-A 114A at block 602 and received from DM-A 114A at block 602. Flow proceeds to block 628.

At block 628, DM-B 114B issues a command to the orphaned I/O ports 128 to enable them to being receiving I/O requests again. Flow proceeds to block 632.

At block 632, the adopted I/O ports 128, i.e., the previously orphaned I/O ports 128, begin receiving I/O requests from the host computers and in response generating IRQs 134 to DM-B 114B. In response, DM-B 114B processes the I/O requests. Flow ends at block 632.

In a typical configuration, the I/O ports 128 used to communicate with host computers are distinct from the I/O ports 128 used to communicate with the disk drives in order to prevent the host computers from directly communicating with the disk drives. In one embodiment, the orphaned I/O ports 128 adopted by the surviving DM-B 114B include orphaned I/O ports 128 previously used by failed DM-A 114A for transferring data with disk drives. An advantage of adopting the disk drive orphaned I/O ports 128 is that a substantial amount of the throughput may be maintained as when operating in normal active-active mode, i.e., prior to failure of DM-A 114A.

Figure 7:
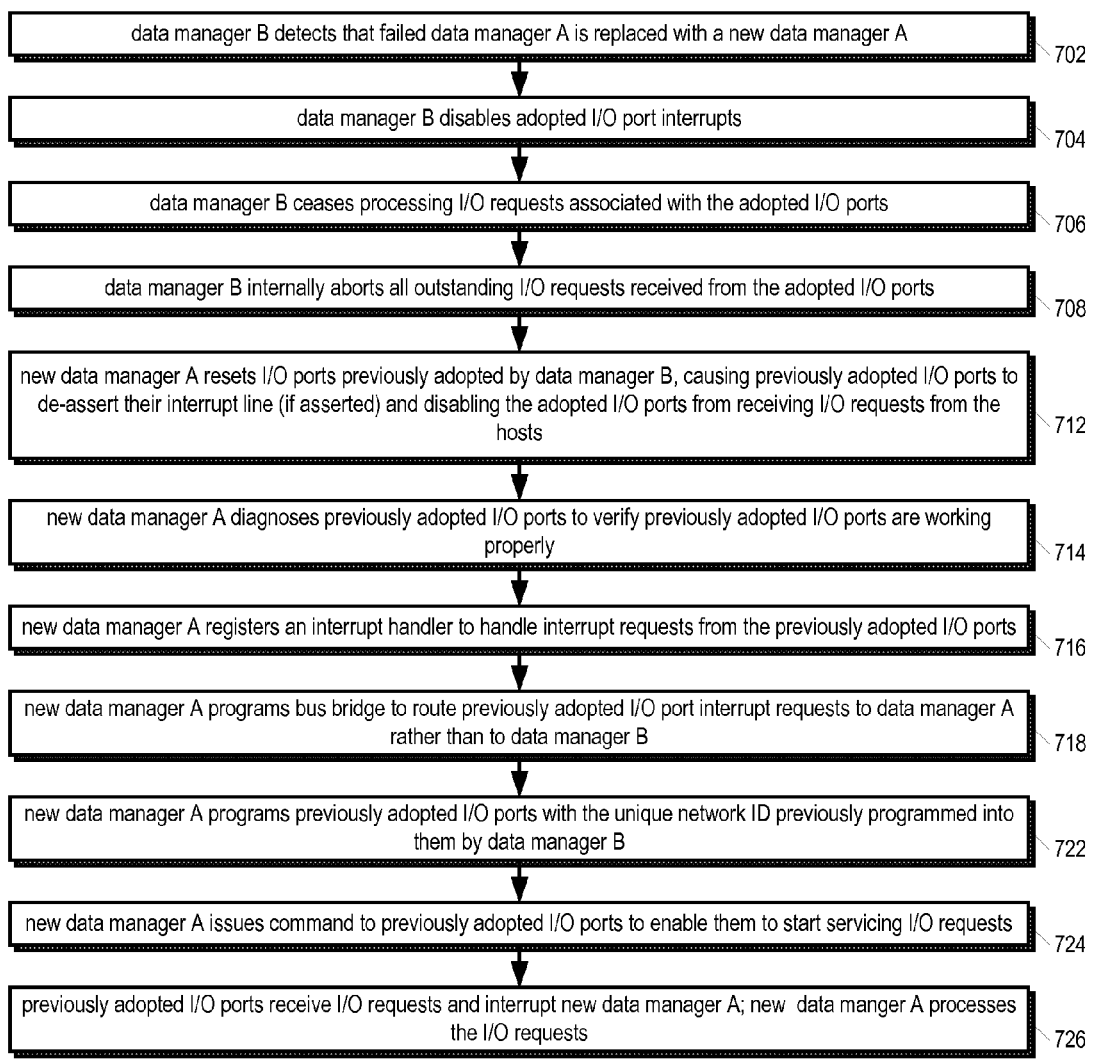
FIG. 7 is a flowchart illustrating failback of the storage controller of FIG. 3 according to the present invention.

Referring now to FIG. 7, a flowchart illustrating failback of the storage controller 300 of FIG. 3 according to the present invention is shown. Failback is the opposite of the failover described in FIG. 6 and occurs when a DM blade 114 is put into operation, such as when the failed DM blade 114 (DM-A 114A) is replaced with a new DM-A 114A, and the surviving, or adopting, DM blade 114 (DM-B 114B) returns the adopted I/O ports 128 back to the new DM blade 114. Another scenario where a DM blade 114 is put into operation is by a user issuing a command to put an already physically installed DM blade 114 back into operation after having been taken out of operation. A portion of the failback operation is performed by the surviving DM blade 114, and a portion is performed by the new DM blade 114. Flow begins at block 702.

At block 702, DM-B 114B detects that the failed DM-A 114A has been replaced with a new, properly functioning, DM-A 114A. In one embodiment, each of the DM blades 114 receives signals from the backplane 108 indicating the presence/absence of a blade in each of the backplane 108 slots of the chassis enclosing the storage controller 300, and DM-B 114B detects that the failed DM-A 114A has been replaced via the blade present/absent signals. Flow proceeds to block 704.

At block 704, DM-B 114B disables interrupts from the IRQs 134 of the adopted I/O ports 128, i.e., from the I/O ports 128 adopted by DM-B 114B according to FIG. 6. Flow proceeds to block 706.

At block 706, DM-B 114B ceases processing I/O requests associated with the adopted I/O ports 128. That is, DM-B 114B ceases to receive I/O requests from the adopted I/O ports 128. Flow proceeds to block 708.

At block 708, DM-B 114B internally aborts all outstanding I/O requests previously received from the adopted I/O ports 128. In one embodiment, the aborted I/O requests will be retried by the host computers and subsequently processed by the new DM-A 114A. Flow proceeds to block 712.

At block 712, the new DM-A 114A resets the I/O ports 128 previously adopted by DM-B 114B, which causes the previously adopted I/O ports 128 to de-assert their IRQs 134 and disables the previously adopted I/O ports 128 from receiving I/O requests from the host computers. Flow proceeds to block 714.

At block 714, the new DM-A 114A diagnoses the previously adopted I/O ports 128 to verify that the previously adopted I/O ports 128 are functioning properly. Flow proceeds to block 716.

At block 716, the new DM-A 114A registers an interrupt handler with its operating system to handle interrupt requests 134 from the previously adopted I/O ports 128. Flow proceeds to block 718.

At block 718, the new DM-A 114A programs the bus bridges 312 to route the previously adopted I/O port 128 IRQs 134 to itself rather than to DM-B 114B. Flow proceeds to block 722.

At block 722, new DM-A 114A program the previously adopted I/O ports 128 with the unique ID previously programmed into them by DM-B 114B. Flow proceeds to block 724.

At block 724, the new DM-A 114A issues a command to the previously adopted I/O ports 128 to enable them to start servicing I/O requests again. Flow proceeds to block 726.

At block 726, the previously adopted I/O ports, i.e., the I/O ports 128 that are now re-adopted by the new DM-A 114A, begin receiving I/O requests from the hosts and generate interrupt requests 134 to the new DM-A 114A. In response, the new DM-A 114A processes the I/O requests, thereby accomplishing failback to the new DM-A 114A. Flow ends at block 726.

Although the present invention and its objects, features, and advantages have been described in detail, other embodiments are encompassed by the invention. For example, although embodiments have been described in which the storage controller 300 includes two data gate blades 116, the invention is not limited to such embodiments. Rather, the orphaned I/O port adoption described herein may be applied to configurations having one data gate blade 116, or more than two data gate blades 116 for increased data availability and/or throughput. In addition, although adoption of orphaned I/O ports 128 has been described in a scenario in which DM-A 114A has failed, the storage controller 300 is configured to perform a symmetric operation for adoption of orphaned I/O ports 128 in a scenario in which DM-B 114B fails. Furthermore, although the local buses 112 have been described as PCI-X buses, the storage controller 300 may employ other local buses, including but not limited to a PCI, CompactPCI, PCI-Express, PCI-X2, EISA, VESA, VME, RapidIO, AGP, ISA, 3GIO, HyperTransport, Futurebus, MultiBus, or any similar local bus capable of transferring data at a high rate. Still further, although the storage controller 300 has been described as a RAID controller, the storage controller 300 may be any type of storage controller, including non-RAID controllers. Additionally, although the storage controller 300 has been described as controlling disk drives, the storage controller 300 may control other storage devices, such as tape drives, optical drives, and the like. Also, although embodiments have been described in which the I/O ports are Fibre-Channel I/O ports, the I/O ports may be any of various I/O port types, including but not limited to Ethernet, Infiniband, TCP/IP, Small Computer Systems Interface (SCSI), HIPPI, Token Ring, Arcnet, FDDI, LocalTalk, ESCON, FICON, ATM, Serial Attached SCSI (SAS), Serial Advanced Technology Attachment (SATA), iSCSI, and the like, and relevant combinations thereof. Furthermore, in one embodiment, each of the DG blades 116 also includes a FC port-bypass circuit (PBC) coupled to each I/O port 128 for coupling the I/O port 128 to an external connector for connecting to a FibreChannel link for connecting to the host computers and disk drives. In one embodiment, the PBCs may be hubbed together to create an FC arbitrated loop. In one embodiment, each of the DG blades 116 also includes a FC loop switch coupled to each of the I/O ports 128 and to the external connectors for connecting to the host computers and disk drives.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A method for adopting an orphaned I/O port of a storage controller, the method comprising:

routing interrupt requests from a third field-replaceable unit (FRU) to a first FRU, wherein the storage controller comprises the first FRU, a second FRU, and the third FRU, wherein the third FRU comprises an I/O port, wherein the I/O port generates the interrupt requests in response to receiving I/O requests from host computers, wherein the host computers are coupled to the I/O port;

processing the I/O requests received by the I/O port, wherein said processing the I/O requests received by the I/O port is performed by the first FRU in response to receiving the interrupt requests from the third FRU, wherein the I/O requests comprise requests by the host computers for the storage controller to transfer data between the host computers and one or more disk drives coupled to the storage controller;

determining that the first FRU has failed and is no longer processing I/O requests received by the I/O port, wherein said determining that the first FRU has failed and is no longer processing I/O requests received by the I/O port is performed by the second FRU; and configuring the third FRU to route the interrupt requests from the I/O port to the second FRU rather than the first FRU, wherein said configuring the third FRU to route the interrupt requests from the I/O port to the second FRU rather than the first FRU is performed by the second FRU in response to said determining that the first FRU has failed.

2. The method of claim 1, further comprising:

processing, by the second FRU, in response to the interrupt requests, the I/O requests received by the I/O port, after said configuring the third FRU to route the interrupt requests to the second FRU.

3. The method of claim 1, further comprising:

receiving user input, prior to said determining, specifying whether to adopt the orphaned I/O port; and said configuring the third FRU to route the interrupt requests from the I/O port to the second FRU rather than the first FRU only if the user input specifies to adopt the orphaned I/O port.

4. The method of claim 1, further comprising:

preventing, by the second FRU, the first FRU from processing the I/O requests, in response to said determining, by the second FRU, that the first FRU has failed.

5. The method of claim 1, further comprising:

resetting, by the second FRU, the I/O port, in response to said determining, by the second FRU, that the first FRU has failed.

6. The method of claim 5, further comprising:

programming, by the second FRU, the I/O port with a unique ID for communicating with the host computers, after said resetting the I/O port.

7. The method of claim 6, further comprising:

receiving, by the second FRU from the first FRU, the unique ID, prior to said detecting, wherein said first FRU initially programmed the I/O port with the unique ID.

8. The method of claim 1, further comprising:

diagnosing, by the second FRU, the I/O port to determine whether the I/O port is functioning properly, in response to said determining, by the second FRU, that the first FRU has failed; and said configuring the third FRU to route the interrupt requests from the I/O port to the second FRU rather than the first FRU only if the I/O port is functioning properly.

9. The method of claim 1, wherein said configuring comprises programming a bridge circuit of the third FRU to route the interrupt requests from the I/O port to the second FRU rather than the first FRU.

* * * * *